(12) United States Patent  
Nana

(10) Patent No.: US 7,636,236 B1
(45) Date of Patent: Dec. 22, 2009

(54) MULTI-FUNCTIONAL LAPTOP

(76) Inventor: Prince K. Nana, 12819 Apollo Dr., Woodbridge, VA (US) 22193

( * ) Notice: Subject to any disclaimer, the term of this patent is extended or adjusted under 35 U.S.C. 154(b) by 83 days.

(21) Appl. No.: 11/938,264

(22) Filed: Nov. 10, 2007

(51) Int. Cl.
 *G06F 1/16* (2006.01)
(52) U.S. Cl. .............................. 361/679.26; 312/223.1; 248/920; 40/530
(58) Field of Classification Search ................................. 361/679.07–679.08, 679.1–679.18, 679.41, 361/679.56; 312/223.1–223.5; 248/917–920; 40/530

See application file for complete search history.

(56) References Cited

U.S. PATENT DOCUMENTS

| | | | |
|---|---|---|---|
| 6,353,529 B1* | 3/2002 | Cies | 361/679.05 |
| 2003/0021086 A1* | 1/2003 | Landry et al. | 361/683 |
| 2005/0157458 A1* | 7/2005 | Yin et al. | 361/683 |

* cited by examiner

*Primary Examiner*—Hung V Duong

(57) ABSTRACT

A multi-functional laptop computer. An illustrative embodiment of the multi-functional laptop computer includes a laptop base, a laptop monitor pivotally carried by the laptop base, a CPU provided in one of the laptop base and the laptop monitor, a keyboard provided on the laptop base and connected to the CPU, a display screen provided on the laptop monitor and connected to the CPU and audio/video ports provided in the laptop base and connected to the CPU.

16 Claims, 6 Drawing Sheets

MULTI-FUNCTIONAL LAPTOP

FIELD

The present disclosure relates to laptop computers. More particularly, the present disclosure relates to a multi-functional laptop computer having various high-end operating capabilities and features for mobile computer use.

BACKGROUND

Laptop computers have become highly popular among mobile computer users due to their mobility and multi-media capabilities. However, conventional laptop computers may lack any of various high-end operating functions such as the facility to receive and display television media; play and record CDs, DVDs and video games; take pictures and record video; and may also lack stand-alone webcam capability.

SUMMARY

The present disclosure is generally directed to a multi-functional laptop computer. An illustrative embodiment of the multi-functional laptop computer includes a laptop base, a laptop monitor pivotally carried by the laptop base, a CPU provided in one of the laptop base and the laptop monitor, a keyboard provided on the laptop base and connected to the CPU, a display screen provided on the laptop monitor and connected to the CPU and audio/video ports provided in the laptop base and connected to the CPU.

DETAILED DESCRIPTION

Figure 3:
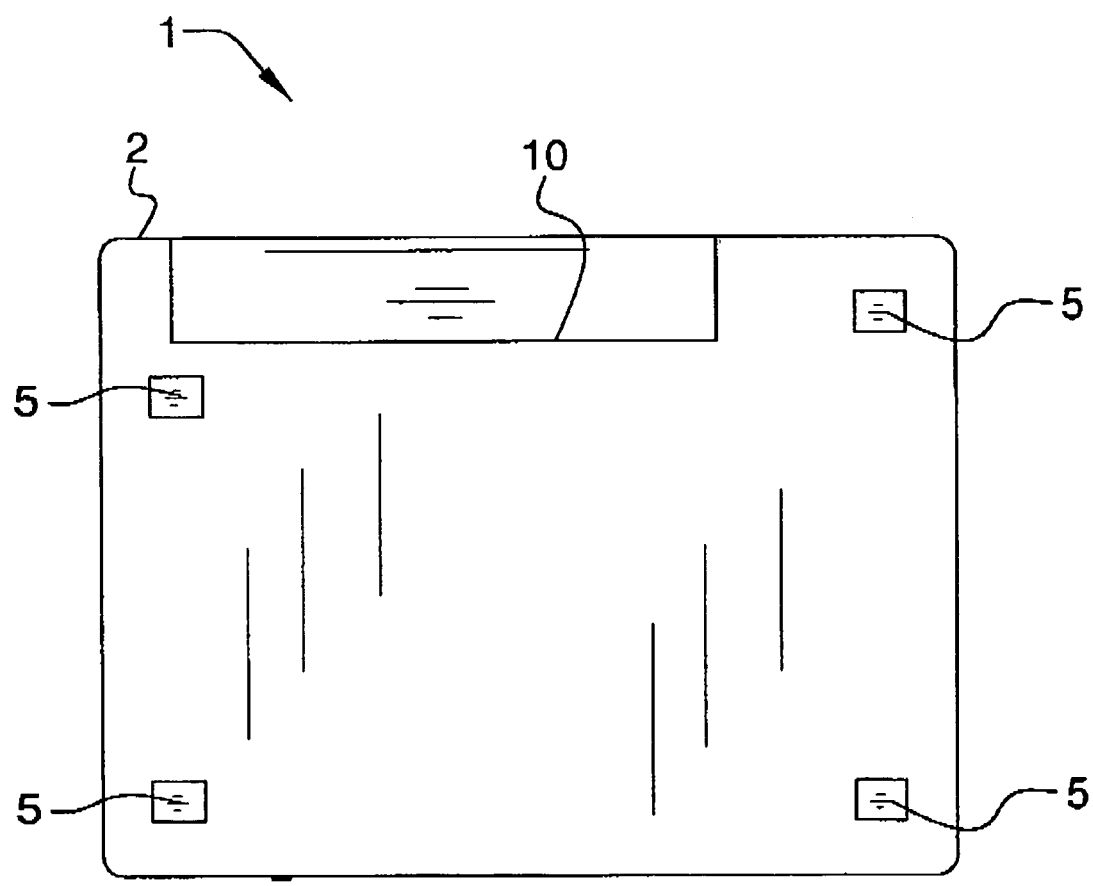
FIG. 3 is a bottom view of an illustrative embodiment of the multi-functional laptop.

Referring to the drawings, an illustrative embodiment of the multi-functional laptop is generally indicated by reference numeral 1. The multi-functional laptop 1 includes a laptop base 2 and a laptop monitor 3 which is pivotally attached to the laptop base 2 by at least one hinge 4. As shown in FIG. 3, multiple feet 5 may be provided on the laptop base 2 to support the laptop base 2 on a flat surface (not shown). A lock slot 6 may be provided in the laptop base 2 and a lock latch 7 provided in the laptop monitor 3 for insertion in the lock slot 6 to selectively close the laptop monitor 3 on the laptop base 2.

Figure 1:
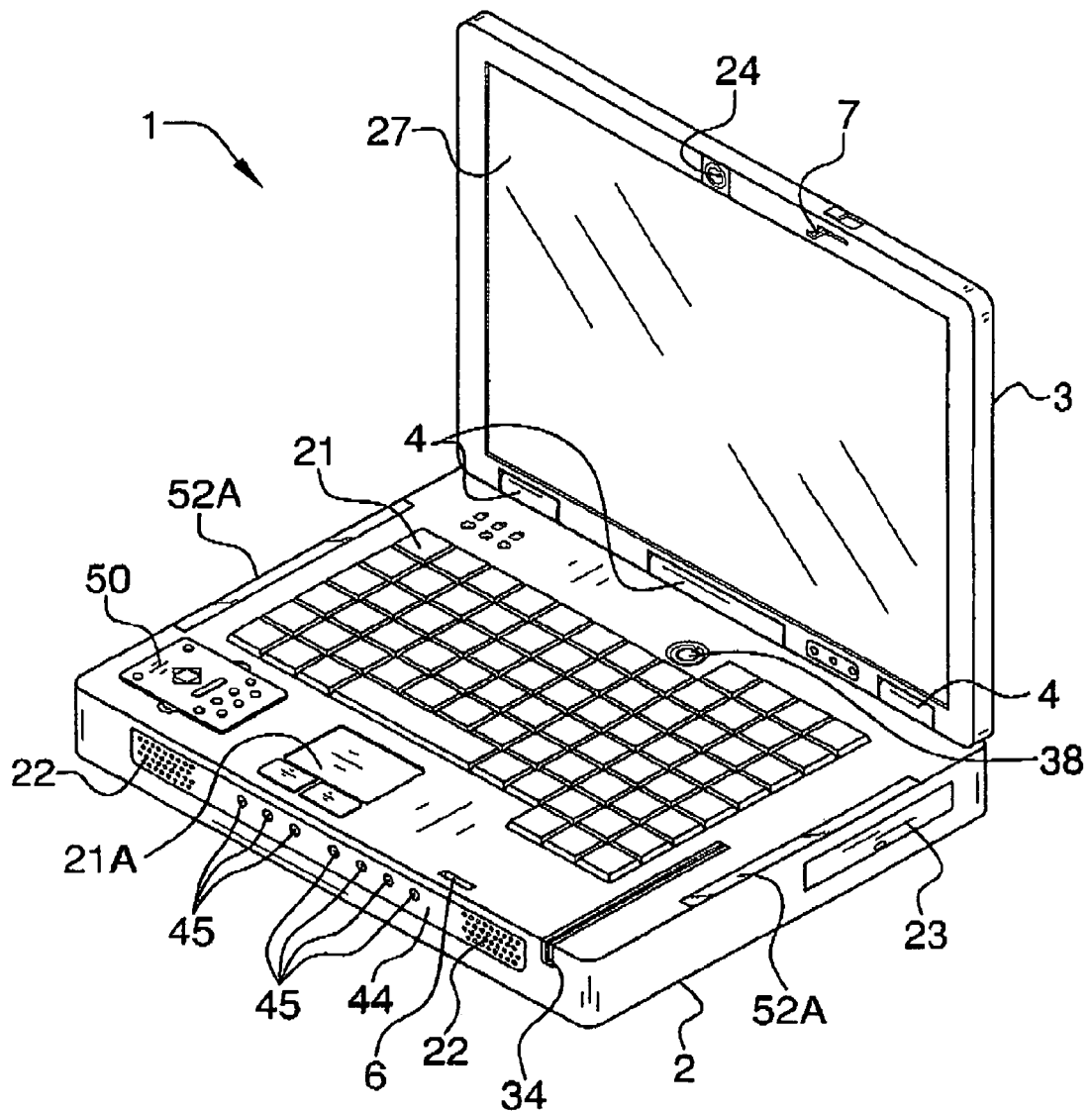
FIG. 1 is a perspective view of an illustrative embodiment of the multifunctional laptop.
Figure 5:
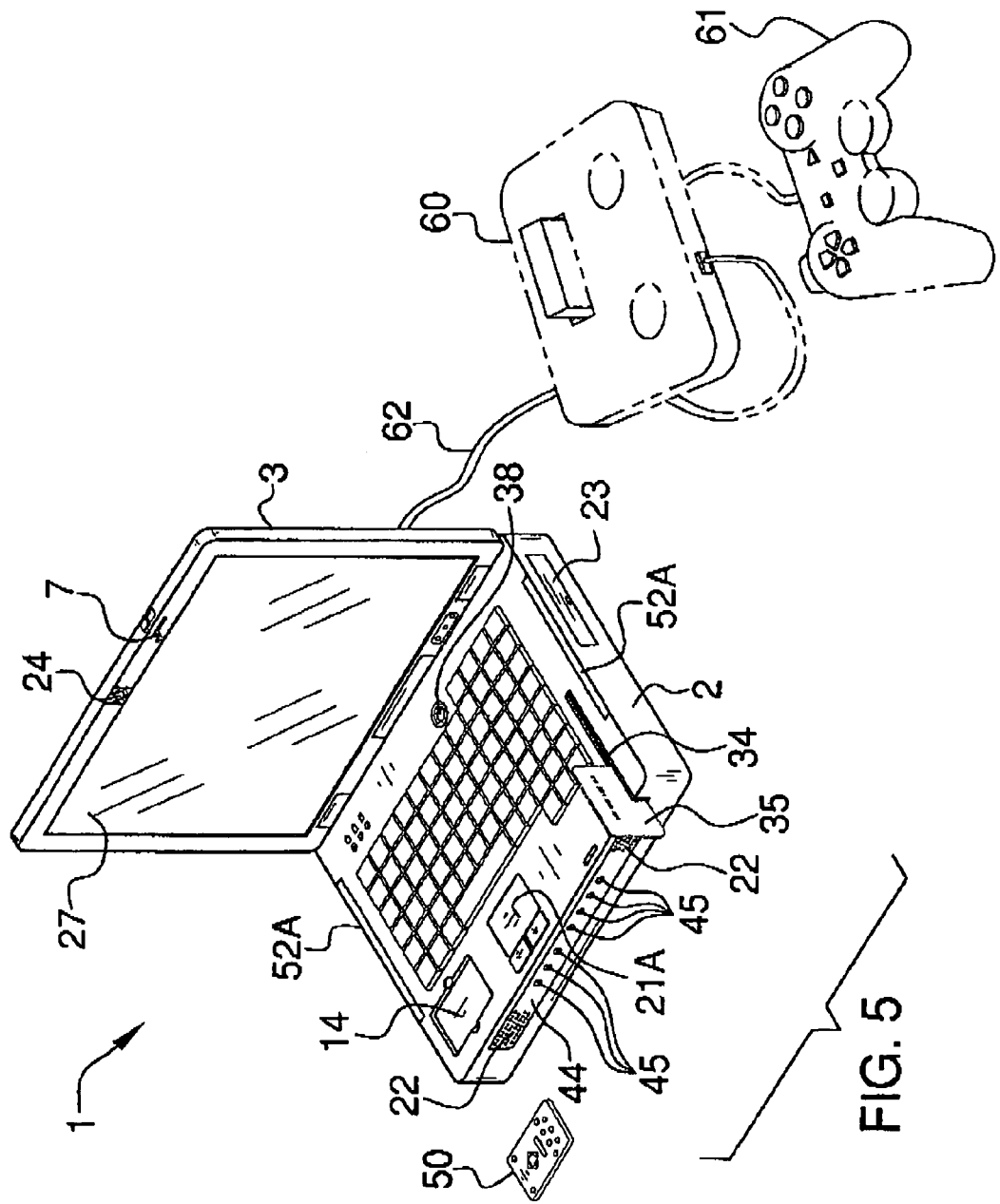
FIG. 5 is a perspective view of an illustrative embodiment of the multi-functional laptop, with a video game console connected to the laptop.
Figure 6:
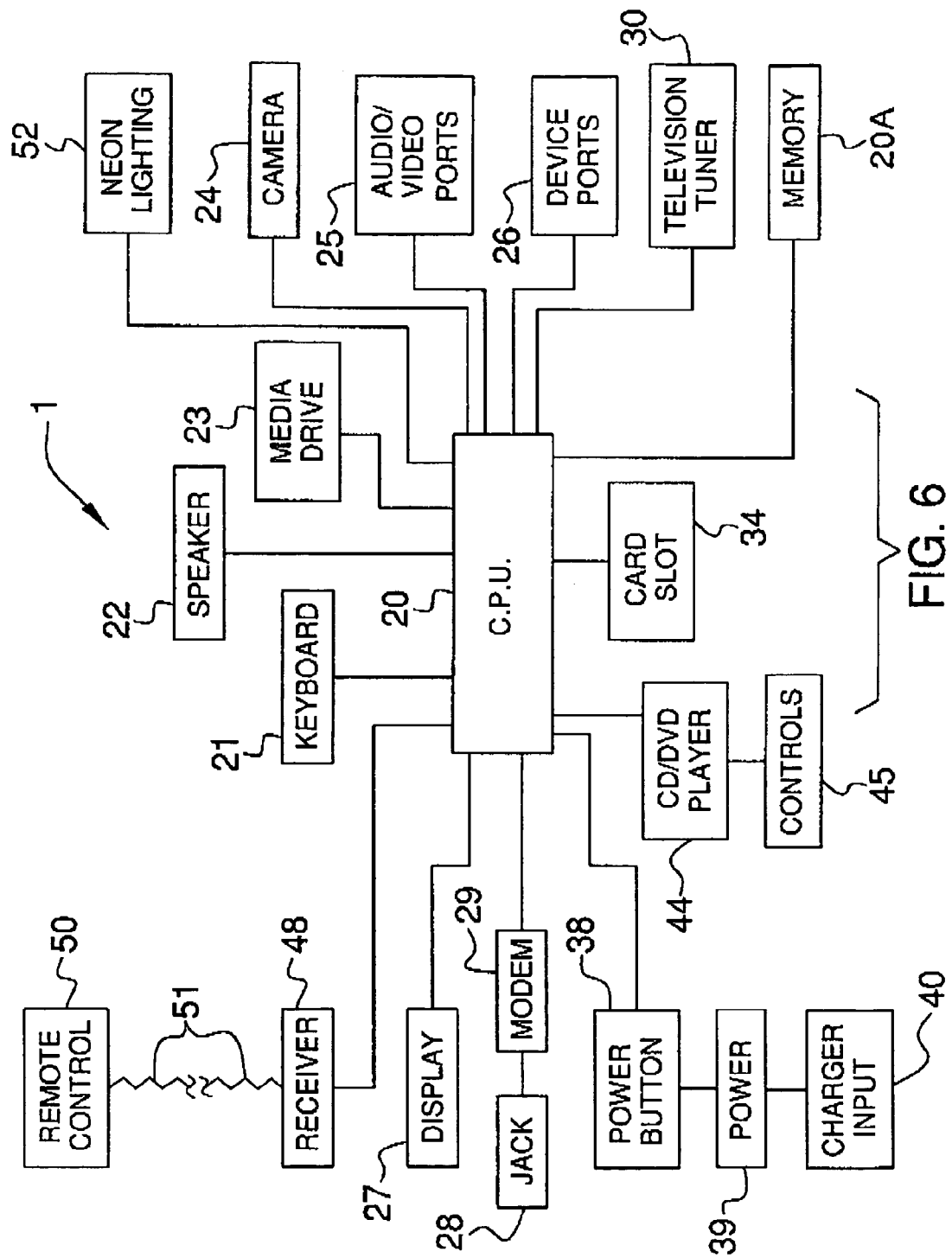
FIG. 6 is a schematic block diagram which illustrates various components of an illustrative embodiment of the multi-functional laptop.

As shown in FIG. 6, the laptop 1 includes a CPU 20 which controls the various functions of the laptop 1. The CPU 20 may be provided in the laptop base 2 and may have a memory 20*a*. As shown in FIGS. 1 and 5, a debit/credit card slot 34 may be provided in the laptop base 2 and connected to the CPU 20 (FIG. 6) to receive a debit/credit card 35. A keyboard 21, which may be a standard computer keyboard, is provided on the laptop base 2. The keyboard 21 may include a mouse touch pad 21*a*. At least one speaker 22 may be provided on the laptop base 2 and/or the laptop monitor 3 and connected to the CPU 20. At least one media drive 23, which may be a CD drive, for example, may be provided in the laptop base 2 and connected to the CPU 20. A camera 24 may be provided on the laptop monitor 3 and connected to the CPU 20 for purposes which will be hereinafter described. A display screen 27 is provided on the laptop monitor 3 and connected to the CPU 20.

As shown in FIG. 6, a power supply 39 is connected to the CPU 20 through a power button 38. As shown in FIG. 1, the power button 38 may be provided on the laptop base 2 such as adjacent to the keyboard 21, for example. The power supply 39 may be at least one rechargeable battery, for example. A charger input jack 40 may be provided on the laptop base 2 and connected to the power supply 39 to facilitate a direct supply of electrical power to the CPU 20 through the power button 38 and/or to facilitate recharging of the power supply 39. As shown in FIG. 3, a battery compartment 10 may be provided in the laptop base 2 to contain the power supply 39.

Figure 2:
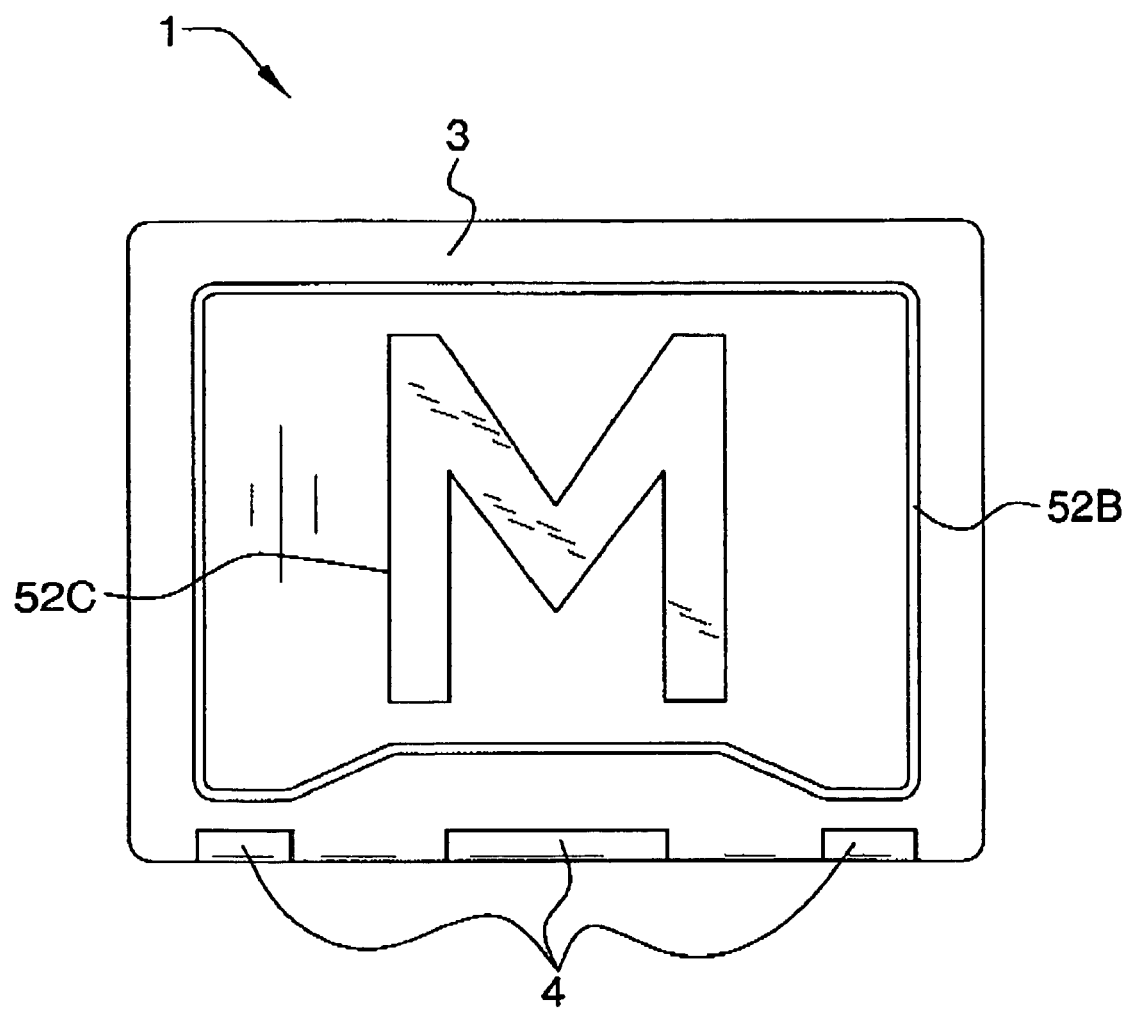
FIG. 2 is a top view of an illustrative embodiment of the multi-functional laptop.

As shown in FIG. 6, neon-type electric lighting 52 may be provided on the laptop base 2 and/or the laptop monitor 3. As shown in FIG. 1, the electric lighting 52 may include, for example, a pair of neon lighting strips 52*a* which are provided on the laptop monitor 3 on respective sides of the keyboard 21. Additionally or alternatively, as shown in FIG. 2, the electric lighting 52 may include a neon accent strip 52*b* which may be provided around or adjacent to the perimeter of the laptop monitor 3. A neon emblem 52*c* may be provided on the laptop base 2. The neon lighting 52 may be connected to the power supply 39 indirectly through the CPU 2, as shown in FIG. 6. Alternatively, the neon lighting 52 may be connected directly to the power supply 39. A light switch (not shown) may be provided between the power supply 39 and the neon lighting 52 and provided on the laptop base 2 or laptop monitor 3 to facilitate selective turning of the neon lighting 52 on and off.

Figure 4:
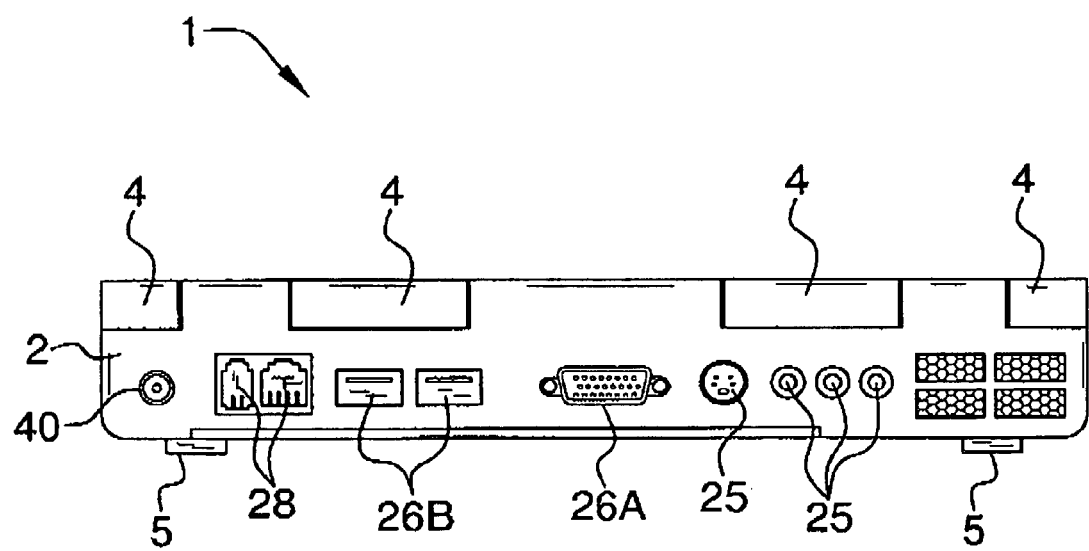
FIG. 4 is a rear view of an illustrative embodiment of the multi-functional laptop.

Various device ports 26 are provided on the laptop base 2 and connected to the CPU 20 to facilitate attachment of various conventional accessories or devices to the multi-functional laptop 1. As shown in FIG. 4, the device ports 26 may include, for example and without limitation, a printer port 26*a* and at least one USB port 26*b*. In some embodiments, at least one telephone jack 28 may additionally be provided in the laptop base 2 and connected to the CPU 20. Accordingly, a modem 29 is connected to the CPU 20 and the at least one telephone jack 28 is connected to the modem 29. At least one USB port 26*b* may be connected to the modem 29 to facilitate wireless Internet capability.

At least one audio/video port 25 may be provided in the laptop base 2. The audio/video port 25 may be adapted to receive a video game cable 62 (FIG. 5) of a video game console 60 to which may be connected hand-held video game controls 61. The CPU 2 is adapted to display on the display screen 27 graphics relating to a video game as it is played using the video game console 60. The CPU 2 is also adapted to emit sounds which relate to the video game from the at least one speaker 22.

A CD/DVD player 44 may be connected to the CPU 20. The CD/DVD player 44 has various controls 45. These controls 45 may include mute and volume buttons as well as play/pause, rewind, fast-forward and stop buttons, for example. The CPU 20 has the capability to play a CD or DVD (not shown) which is inserted in the CD/DVD player 44 and emit audio volume from the CD or DVD through the at least one speaker 22 and display images from the CD or DVD on the display screen 27.

As further shown in FIG. 6, a receiver 48 may be connected to the CPU 2. The receiver 48 is adapted to interface wirelessly with the remote control 50 by receiving radio signals 51 from the remote control 50. The remote control 50 is adapted to facilitate control of the various operational functions of the multi-functional laptop 1. As shown in FIGS. 1 and 3, a remote control depression 14 may be provided in the laptop base 2 to receive the remote control 50 in a snap-fit when the remote control 50 is not in use.

In some embodiments, a television tuner 30 is connected to the CPU 20. The television tuner 30 is adapted to receive television programming via the receiver 48 or through an antenna (not shown) which is connected to the CPU 20. The CPU 20 is adapted to display the television programming on the display screen 27. Television tuner controls (not shown) are connected to the CPU 20 or the television tuner 30 and may be provided on the laptop base 2.

The camera 24 may have the capability to transmit digital image data to the microprocessor 2, which may be adapted to record the digital images on a CD or DVD (not shown) inserted in the CD/DVD player 44 and/or store the digital images in the memory 20a. The camera 24 may additionally have webcam capability for the purpose of communicating with others through an internet connection via the telephone jack or jacks 28 or the USB port 26b (FIG. 4).

In typical use, the multi-functional laptop 1 is highly portable and can be carried among multiple locations. Conventional use of the multi-functional laptop 1 may be carried out using the keyboard 21, media drive 23, printer port 26a and one or more of the USB ports 26b. Images from a CD or DVD (not shown) inserted in the CD/DVD player 44 can be displayed on the display screen 27. Audio from the CD or DVD can be played through the at least one speaker 22. Control of the CD/DVD player is facilitated typically by manipulation of the controls 45. Alternatively, the CD/DVD player may be controlled using the remote control 50. The camera 24 may be operated to record digital images on the CD or DVD (not shown) inserted in the CD/DVD player 44 typically using the controls 45 of the CD/DVD player 44.

Internet usage may be accessed via dial-up technology the telephone jack or jacks 28, or wirelessly using a wireless router (not shown) or through a cable hookup (not shown) through a USB port 26b. The camera 24 may be used as a webcam to sight and post real-time video images on the Internet. Financial and/or other data (not shown) provided on a debit/credit card 35 (FIG. 5) may be accessed and processed by the CPU 20 through insertion of the debit/credit card 35 in the debit/credit card slot 34. As shown in FIG. 5, a video game console 60 may be connected to the audio and video ports via one or more video game cable 62 to facilitate the playing of video games typically using the video game controls 61. The electric neon-type lighting 52 may be automatically energized upon depression of the power button 38 on the multi-functional laptop 1; or alternatively, may be separately energized using a separate control (not shown). In some embodiments, any or all of the functions of the multi-functional laptop computer 1 may be controlled wirelessly using the remote control 50.

While the preferred embodiments of the invention have been described above, it will be recognized and understood that various modifications can be made in the invention and the appended claims are intended to cover all such modifications which may fall within the spirit and scope of the invention.

What is claimed is:

1. A multi-functional laptop computer, comprising:
    a laptop base;
    a laptop monitor pivotally carried by said laptop base;
    electric lighting provided on at least one of said laptop base and said laptop monitor;
    a CPU provided in one of said laptop base and said laptop monitor;
    a keyboard provided on said laptop base and connected to said CPU;
    a display screen provided on said laptop monitor and connected to said CPU; and
    audio/video ports provided in said laptop base and connected to said CPU.

2. The multi-functional laptop computer of claim 1 further comprising a CD/DVD player provided in said laptop base and connected to said CPU.

3. The multi-functional laptop computer of claim 1 further comprising a receiver connected to said CPU and a remote control interfacing wirelessly with said receiver.

4. The multi-functional laptop computer of claim 1 further comprising a television tuner connected to said CPU.

5. The multi-functional laptop computer of claim 1 further comprising a camera provided in said laptop monitor and connected to said CPU.

6. The multi-functional laptop computer of claim 1 wherein said electric lighting comprises a pair of lighting strips provided on said laptop base.

7. The multi-functional laptop computer of claim 1 wherein said electric lighting comprises an accent strip provided on said laptop monitor.

8. The multi-functional laptop computer of claim 1 wherein said electric lighting comprises a neon emblem provided on said laptop monitor.

9. A multi-functional laptop computer, comprising:
    a laptop base;
    a laptop monitor pivotally carried by said laptop base;
    electric lighting provided on at least one of said laptop base and said laptop monitor;
    a CPU provided in one of said laptop base and said laptop monitor;
    a keyboard provided on said laptop base and connected to said CPU;
    a display screen provided on said laptop monitor and connected to said CPU; and
    a credit/debit card slot provided in said laptop base and connected to said CPU.

10. The multi-functional laptop computer of claim 9 further comprising a CD/DVD player provided in said laptop base and connected to said CPU.

11. The multi-functional laptop computer of claim 9 further comprising a receiver connected to said CPU and a remote control interfacing wirelessly with said receiver.

12. The multi-functional laptop computer of claim 9 further comprising a television tuner connected to said CPU.

13. The multi-functional laptop computer of claim 9 further comprising a camera provided in said laptop monitor and connected to said CPU.

14. The multi-functional laptop computer of claim 9 wherein said electric lighting comprises a pair of lighting strips provided on said laptop base.

15. The multi-functional laptop computer of claim 9 wherein said electric lighting comprises an accent strip provided on said laptop monitor.

16. The multi-functional laptop computer of claim 9 wherein said electric lighting comprises a neon emblem provided on said laptop monitor.

* * * * *